United States Patent
Paek et al.

(10) Patent No.: US 12,116,642 B2
(45) Date of Patent: Oct. 15, 2024

(54) LIGNOCELLULOSIC BIOMASS TREATMENT METHODS AND SYSTEMS FOR PRODUCTION OF BIOFUELS AND BIOCHEMICALS

(71) Applicant: ExxonMobil Technology and Engineering Company, Annandale, NJ (US)

(72) Inventors: Changyub Paek, Bridgewater, NJ (US); Arsam Behkish, Flemington, NJ (US); Giovanni Pilloni, Jersey City, NJ (US)

(73) Assignee: ExxonMobil Technology and Engineering Company, Annandale, NJ (US)

(*) Notice: Subject to any disclaimer, the term of this patent is extended or adjusted under 35 U.S.C. 154(b) by 369 days.

(21) Appl. No.: 17/142,799

(22) Filed: Jan. 6, 2021

(65) Prior Publication Data
US 2021/0269889 A1   Sep. 2, 2021

Related U.S. Application Data

(60) Provisional application No. 62/984,014, filed on Mar. 2, 2020.

(51) Int. Cl.
C13K 1/04 (2006.01)
B01D 15/18 (2006.01)
(Continued)

(52) U.S. Cl.
CPC ............ *C13K 1/04* (2013.01); *B01D 15/1892* (2013.01); *C01B 32/324* (2017.08); *C02F 3/2893* (2013.01); *C02F 2101/30* (2013.01)

(58) Field of Classification Search
CPC .... C13K 1/04; B01D 15/1892; C01B 32/324; C02F 3/2893; C02F 2101/30; Y02E 50/30; Y02W 10/37
(Continued)

(56) References Cited

U.S. PATENT DOCUMENTS 4,338,198 A * 7/1982 Brown .................... C01B 32/36
                                              432/15
5,824,221 A * 10/1998 Thuer .................... C02F 1/283
                                              210/605
(Continued)

FOREIGN PATENT DOCUMENTS

EP       2468875 A1    6/2012
WO    2010/078930 A2   7/2010
(Continued)

OTHER PUBLICATIONS

Zhong_Bioresource_Technology_NPL.pdf (Year: 2014).*
(Continued)

*Primary Examiner* — Ekandra S. Miller-Cruz
(74) *Attorney, Agent, or Firm* — Shook, Hardy & Bacon L.L.P.

(57) ABSTRACT

The present disclosure relates to methods and systems for converting biomass comprising lignocellulosic material into biofuels and biochemicals that contribute to reduction of greenhouse gas emissions. In particular, the present disclosure relates to methods and systems for the removal or reduction of impurities during lignocellulosic biomass processing to enhance biorefinery production of biofuels and biochemicals.

22 Claims, 3 Drawing Sheets

(51) Int. Cl.
*C01B 32/324* (2017.01)
*C02F 3/28* (2023.01)
*C02F 101/30* (2006.01)

(58) Field of Classification Search
USPC .......................................................... 127/1
See application file for complete search history.

(56) References Cited

U.S. PATENT DOCUMENTS

| | | | |
|---|---|---|---|
| 8,017,373 | B2 | 9/2011 | Hill et al. |
| 8,236,535 | B2 | 8/2012 | Medoff et al. |
| 8,519,171 | B2 | 8/2013 | Koudil et al. |
| 8,545,633 | B2 | 10/2013 | Nguyen |
| 8,641,910 | B2 | 2/2014 | Wietgrefe |
| 9,809,867 | B2 * | 11/2017 | Parekh .............. C12P 19/02 |
| 2007/0259412 | A1 | 11/2007 | Belanger et al. |
| 2009/0064567 | A1 | 3/2009 | Lippmeier et al. |
| 2010/0093047 | A1 | 4/2010 | Newman et al. |
| 2010/0124770 | A1 | 5/2010 | Sabesan et al. |
| 2010/0146843 | A1 | 6/2010 | Dumenil |
| 2010/0146844 | A1 | 6/2010 | Dumenil |
| 2012/0077234 | A1 | 3/2012 | Hazlebeck |
| 2012/0159839 | A1 | 6/2012 | Koskinen et al. |
| 2012/0316330 | A1 | 12/2012 | Zhu et al. |
| 2014/0030769 | A1 | 1/2014 | Resch et al. |
| 2015/0144564 | A1 | 5/2015 | Moller et al. |
| 2015/0197424 | A1 | 7/2015 | Mennell et al. |
| 2015/0299739 | A1 | 10/2015 | Harlick et al. |
| 2016/0032414 | A1 * | 2/2016 | Parekh ............ C13K 13/007 127/55 |
| 2016/0122786 | A1 | 5/2016 | Lin et al. |
| 2016/0138048 | A1 | 5/2016 | Snyder et al. |
| 2016/0244788 | A1 | 8/2016 | Retsina et al. |
| 2017/0002387 | A1 | 1/2017 | Retsina et al. |
| 2017/0051320 | A1 | 2/2017 | Yamashita et al. |
| 2017/0175152 | A1 | 6/2017 | McNeely et al. |
| 2017/0226535 | A1 | 8/2017 | Tudman |
| 2018/0010154 | A1 | 1/2018 | Smits |
| 2018/0312411 | A1 * | 11/2018 | Perot ................... B01J 20/20 |
| 2020/0181664 | A1 | 6/2020 | Behkish et al. |
| 2021/0017549 | A1 | 1/2021 | Behkish et al. |

FOREIGN PATENT DOCUMENTS

| | | |
|---|---|---|
| WO | 2011/073781 A2 | 6/2011 |
| WO | 2012/010750 A2 | 1/2012 |
| WO | 2014/089652 A1 | 6/2014 |
| WO | 2017/093526 A1 | 6/2017 |
| WO | 2018/027181 A1 | 2/2018 |

OTHER PUBLICATIONS

Al-Lagtah, Chemical and physical characteristics of optimal synthesised activated carbons from grass-derived sulfonated lignin versus commercial activated carbons, Microporous and Mesoporous Materials (Year: 2016).*
Rodriguez-Mirasol et al., "Activated Carbons from CO2 Partial Gasification of Eucalyptus Kraft Lignin", Energy & Fuels (1993), vol. 7, pp. 133-138.
Olivares-Marin et al., "Preparation of activated carbon from cherry stones by physical activation in air. Influence of the chemical carbonisation with H2SO4", J. of Analytical and Applied Pyrolysis (2012), vol. 94, pp. 131-137.
Suhas et al., "Lignin—from natural adsorbent to activated carbon: A review", Bioresource Technology (2007), vol. 98, pp. 2301-2312.
Contescu et al., "Activated Carbons Derived from High-Temperature Pyrolysis of Lignocellulosic Biomass", J. of Carbon Research (2018), vol. 4, pp. 1-15.
Davis, R., et al., "Process Design and Economics for the Conversion of Lignocellulosic Biomass to Hydrocarbons: Dilute-Acid and Enzymatic Deconstruction of Biomass to Sugars and Biological Conversion of Sugars to Hydrocarbons." United States: N. p., 2013.Web. doi: 10.2172/1107470 (147 pages).
Davis, R., et al., "Process Design and Economics for the Conversion of Lignocellulosic Biomass to Hydrocarbons: Dilute-Acid and Enzymatic Deconstruction of Biomass to Sugars and Biological Conversion of Sugars to Hydrocarbons." United States: N. p., 2015.Web. doi: 10.2172/1107470 (133 pages).
Deveci et al., "Adsorption of hexavalent chromium from aqueous solutions by bio-chars obtained during biomass pyrolysis", Journal of Industrial and Engineering Chemistry vol. 19 (2013) pp. 190-196.
Han et al. Characterization of a Bifunctional Cellulase and Its Structural Gene. JBC (1995), 43(27), 26012-26019. (Year: 1995).
Humbird, D, et al. Process Design and Economics for Biochemical Conversion of Lignocellulosic Biomass to Ethanol: Dilute-Acid Pretreatment and Enzymatic Hydrolysis of Corn Stover. United States: N. p., 2011.Web. :loi:10.2172/1013269 (147 pages).
International Search Report and Written Opinion received for PCT Patent Application No. PCT/US2019/065231, mailed on Apr. 15, 2020, 13 pages.
Karaosmanoglu et al. Investigation of the Refining Step of Biodiesel Production. Energy and Fuels (1996), 10, 890-895. (Year: 1996).
Non-Final Office Action received for U.S. Appl. No. 17/190,478, mailed on Feb. 1, 2024, 10 pages.
Si et al. Lignin extraction distinctively enhances biomass enzymatic saccharification in hemicelluloses-rich *Miscanthus* species under various alkali and acid pretreatments. Bioresource Technology (2015), 183, 248-524. (Year: 2015).
Steen et al. Microbial production of fatty-acid-derived fuels and chemicals from plant biomass. Nature (2010), 463, 559-562. (Year: 2010).
Final Office Action received for U.S. Appl. No. 17/190,478, mailed on Aug. 23, 2024, 5 pages.

* cited by examiner

LIGNOCELLULOSIC BIOMASS TREATMENT METHODS AND SYSTEMS FOR PRODUCTION OF BIOFUELS AND BIOCHEMICALS

CROSS-REFERENCE TO RELATED APPLICATIONS

This application claims the benefit of priority from U.S. Provisional Application No. 62/984,014 filed Mar. 2, 2020, which is herein incorporated by reference in its entirety.

FIELD OF THE INVENTION

The present disclosure relates to methods and systems for converting biomass comprising lignocellulosic material into biofuels and biochemicals.

BACKGROUND OF THE INVENTION

Global efforts are underway for the development of sustainable sources of energy, including biofuels and biochemicals, to reduce reliance on fossil fuels and reduce greenhouse gas emissions. For example, the United States, through the Energy Independence and Security Act (EISA) of 2007 and subsequently the expanded Renewable Fuel Standard (RFS) program, aims to increase the production of renewable fuel, particularly for use in transportation, by increasing amounts each year relative to petroleum-based fuels. Accordingly, the development of renewable or sustainable energy is of particular interest.

The use of biomass for making sustainable energy has been a focus for achieving reduced greenhouse gas emissions (GHG). The RFS targets are therefore set to reduce emissions based on feedstock source of the biofuel. Currently, such sustainable energy efforts have largely focused on so-called "first-generation" biofuels derived from food-related biomass and the fermentable sugars therein. For example, fermentable sugars have been derived from sugarcane or corn and biologically fermented mainly to bioethanol. On the other hand, vegetable oils, animal fats, and the like have been chemically transesterified to produce biodiesel. A primary source of food-related first-generation biomass currently used for producing sustainable energy is derived from corn (e.g., corn starch). However, food-related biomasses, such as corn, are major global food sources and, accordingly, the first-generation efforts for producing sustainable energy competes with food availability. Furthermore, the reduction in GHG emissions associated with first-generation biofuels is dampened primarily due to the uncertainty associated with land use change.

As a result, new efforts, including mandates from the RFS program, have been focused on so-called "second-generation" biofuels derived from non-food biomass to meet the demand for sustainable energy without competing with food resources. These non-food biomass sources include, for example, residues from agriculture, forestry, and municipal solid waste. It is estimated that second-generation sustainable energy could satisfy a sizable percentage of the transportation fuel and diesel demands in the near future, thereby decreasing reliance on fossil fuels. Furthermore, the potential to reduce GHG emissions is greater for second-generation biofuels than for first-generation.

A source of second-generation biomass that has been of interest is non-food biomass comprising lignocellulosic material. Lignocellulose is a complex of lignin, hemicellulose, and cellulose present in plant cell walls. Lignocellulosic is readily available (e.g., derivable from sources including, among others, agricultural waste, forest residue, energy crops, and the like), and does not compete with food resources to supply fermentable sugars that can be harnessed to produce biofuels and biochemicals.

However, in order to produce biofuels and biochemicals from lignocellulosic biomass, the biomass is generally deconstructed into its primary components. The deconstruction process can lead to the presence of certain impurities that can interfere, inhibit, or otherwise be toxic to further downstream fermentation processes, thus requiring employment of impurity removal techniques that are often high energy consuming, costly, and time consuming, thereby reducing the attractiveness of biofuels and biochemicals production from such lignocellulosic material.

SUMMARY OF THE INVENTION

The present disclosure relates to methods and systems for converting biomass comprising lignocellulosic material into biofuels and biochemicals that contribute to reduction of greenhouse gas emissions, and more particularly, to the removal or reduction of impurities during lignocellulosic biomass processing to enhance biorefinery production of biofuels and biochemicals.

In some aspects, a method is disclosed that includes the steps of hydrolyzing lignocellulosic biomass, thereby forming a hydrolysis steam. Lignin is separated from the hydrolysis stream, thereby forming a lignin-rich stream and a lignin-free stream and the lignin-rich stream is purified using lignin-based activated carbon, thereby producing a purified lignin-free stream.

In some aspects a system is disclosed that includes a biorefinery that comprises integrated equipment to convert biomass to produce at least one or more of a biofuel and biochemical. The biorefinery is configured to perform the method of hydrolyzing lignocellulosic biomass, thereby forming a hydrolysis steam. Lignin is separated from the hydrolysis stream, thereby forming a lignin-rich stream and a lignin-free stream and the lignin-rich stream is purified using lignin-based activated carbon, thereby producing a purified lignin-free stream.

BRIEF DESCRIPTION OF THE DRAWINGS

The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION OF THE INVENTION

Figure 1:
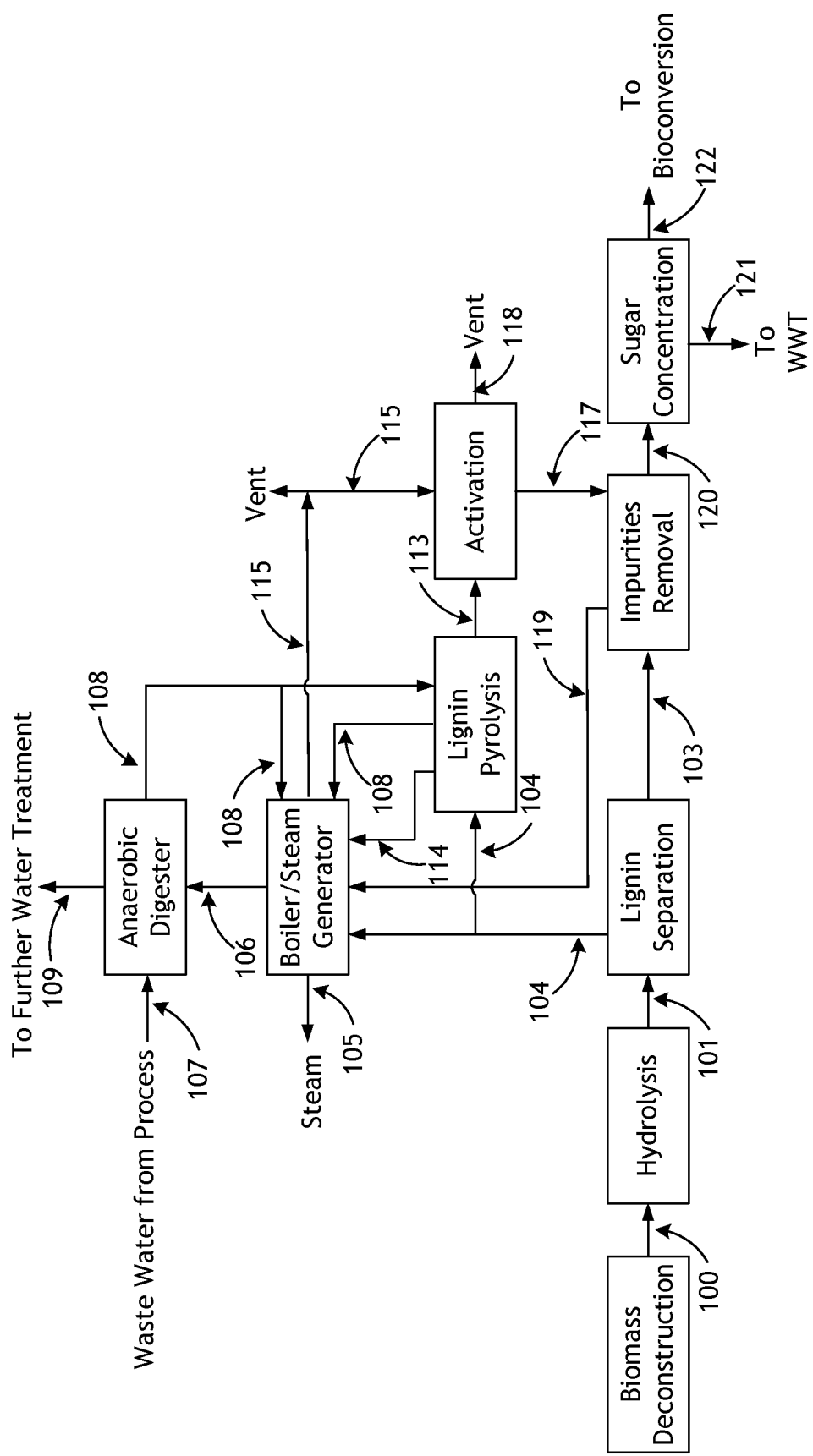
FIG. 1 is a schematic flowchart demonstrating one or more aspects of the biological conversion platform of sugars obtained from lignocellulosic biomass of the present disclosure.
Figure 2:
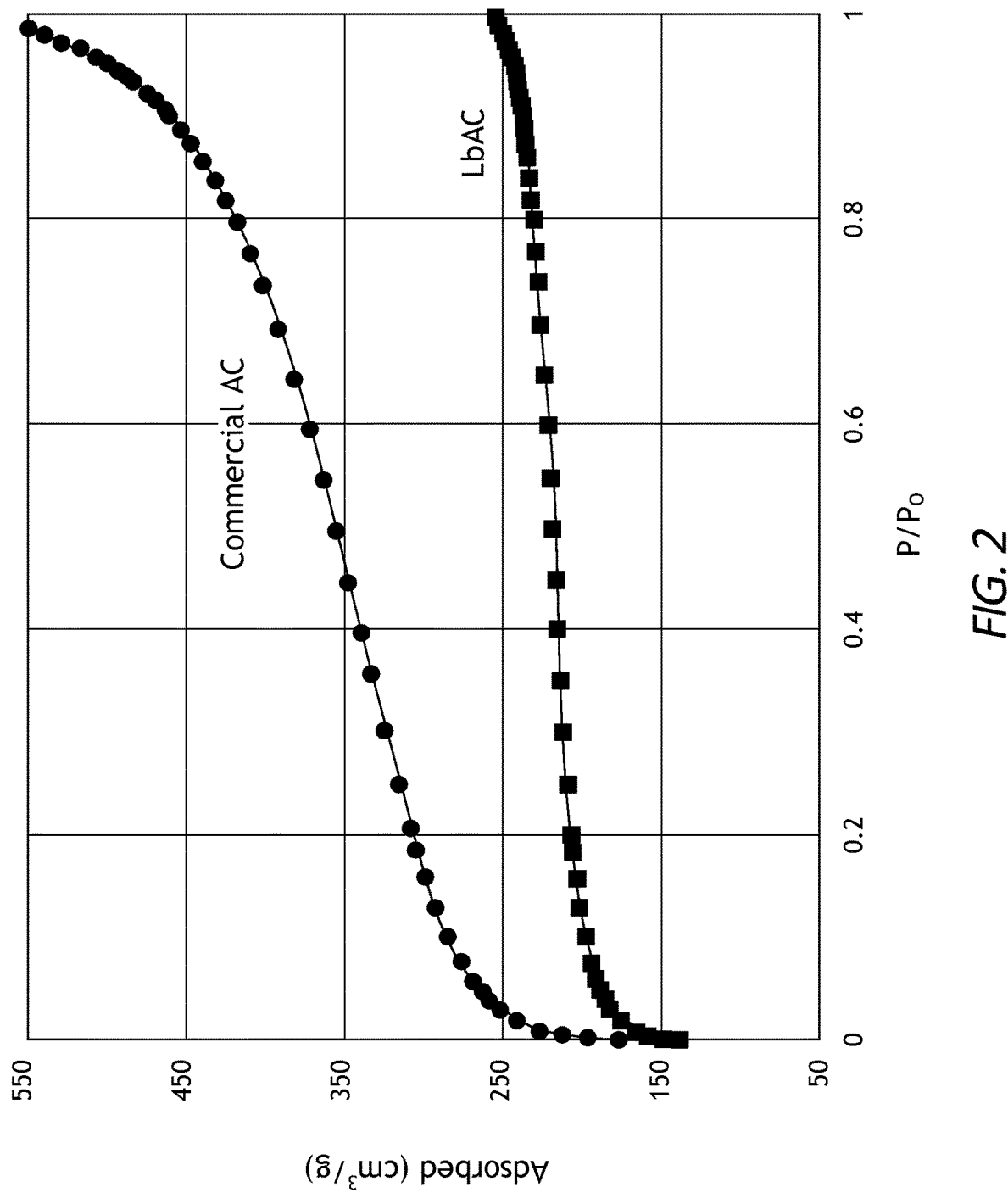
FIG. 2 is a N2 isotherm comparing commercially available activated carbon and lignin-based activated carbon.

The present disclosure relates to methods and systems for converting biomass comprising lignocellulosic material into biofuels and biochemicals that contribute to reduction of greenhouse gas emissions, and more particularly, to the removal or reduction of impurities during lignocellulosic biomass processing to enhance biorefinery production of biofuels and biochemicals.

Global demands are motivating the need for the development of sustainable energy, such as biofuels and biochemicals, which can decrease greenhouse gas emissions, decrease reliance on fossil fuels, and not compete with food sources. These demands are heightened by increasing environmental regulations for the decarbonization of energy. Lignocellulosic material derived from plant biomass (or "lignocellulosic biomass") can be used to satisfy these demands. Lignocellulosic biomass is readily available and may be sourced from agricultural residue and waste, forest residue, energy crops, among other sources.

An initial life cycle assessment of the use of sustainable energy derived from lignocellulosic biomass estimates an upward of 50% potential decrease in greenhouse gas emissions compared to diesel derived from fossil fuels. Indeed, current available collections of corn stover from corn production in the U.S. could satisfy 15% of the domestic distillate fuel demand. Accordingly, bioconversion processes that can effectively convert lignocellulosic biomass, particularly at commercial scales, have the potential to greatly reduce greenhouse gas emissions without competing with important food resources.

Bioconversion of lignocellulosic biomass typically requires that the biomass be initially deconstructed into its main components of primarily hemicellulose, cellulose, and lignin. Thereafter, the deconstructed biomass may be hydrolyzed (e.g., enzymatically hydrolyzed) to release sugars therefrom (the "hydrolysate"). The released sugars in the hydrolysate may then be concentrated and converted to products, like biofuels or biochemical, through bio-fermentation.

During the initial deconstruction process, various impurities may be introduced to the biomass. These impurities can interfere, inhibit, or otherwise be toxic to the further downstream processing techniques for the production of useful biofuels and/or biochemicals. Such impurities may comprise species including, for example, salts, hydroxymethylfurfual, furfurals, vanillin, formic acid, acetic acid, lactic acid, and the like, including those additional impurities described herein. These impurities are known to negatively affect the downstream bioconversion of sugars. Typically, these impurities are, accordingly, removed by one or more techniques, which are often energy intensive, costly, and time consuming (e.g., use of a resin bed, a reactive extraction, or a bio-conversion of the impurities using microorganisms).

The present disclosure provides a self-supporting and energy-efficient way of removing or otherwise reducing the aforementioned impurities (i.e., toxic, inhibitory, and the like) derived during a lignocellulosic biomass deconstruction step, thereby enhancing the biofuel or biochemical productivity of a biorefinery. The methods and systems described herein integrate adsorptive hydrolysate conditioning to remove or reduce the aforementioned impurities by utilizing a side stream of low-value byproducts produced during a biological conversion process to prepare adsorptive separation media in the form of lignin-based activated carbon (LbAC). Such an integrated, self-contained system, among other advantages, enhances energy efficiency, requires no additional inputs into the system (e.g., no additional gasses, pressurization steps, and the like), and decreases the load on wastewater treatment systems, as described hereinbelow.

More particularly, the methods and systems described herein utilize low-value lignin and biogas byproducts to produce LbAC in a two-step process: first, the pyrolysis of lignin to generate carbonaceous material, referred to as biochar, followed by, second, activation of the carbonaceous material to generate the LbAC absorption media. The adsorption media comprising the impurities may be further integrated into the conversion process, or other processes, and may be ultimately burnt (e.g., in a steam boiler) to generate power such as steam and/or electricity. As such, the methods and systems described herein further reduce or mitigate overall toxicity of a bioconversion process and the wastewater generated therefrom because impurities (including toxins) are removed prior to wastewater treatment. Moreover, the methods and systems described herein enable biorefinery flexibility to optimize on-site manufacturing of lignin-based adsorbent depending on the composition of a hydrolysate and thresholds set specific to downstream bioconversion techniques. That is, an optimal amount of LbAC can be produced without any or without substantial excess, thereby decreasing the energy and other processing loads on the system.

One or more illustrative incarnations incorporating one or more elements are presented herein. Not all features of a physical implementation are described or shown in this application for the sake of clarity. It is understood that in the development of a physical embodiment incorporating one or more elements of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present disclosure. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps.

Various terms as used herein are defined hereinbelow. To the extent a term used in a claim is not defined below, it should be given the broadest definition persons in the pertinent art have given that term as reflected in one or more printed publications or issued patents.

As used herein, the terms "lignocellulosic material," "lignocellulosic biomass," and "lignocellulose," and grammatical variants thereof, are used herein interchangeably and are broad terms encompassing a complex of namely hemicellulose, cellulose, and lignin present in the cell walls of woody plants. Lignocellulosic material may be derived from various sources including, but not limited to, agricultural residues and waste (e.g., corn stover, wheat straw, bagasse), forest residues (e.g., woodchips), energy crops (e.g., switch grass, wheatgrass, bamboo), and the like, and any combination thereof.

As used herein, the term "biomass," and grammatical variants thereof, refers to biological, organic matter that can be converted to fuel. The biomass for use in the embodiments of the present disclosure refers to organic plant matter.

As used herein, the term "biofuel." and grammatical variants thereof, refers to a fuel derived directly or indirectly from biological, organic matter, used as an energy source (e.g., to produce heat or power).

As used herein, the term "biochemical." and grammatical variants thereof, refers to a chemical product or intermediate derived directly or indirectly from a biological process.

As used herein, the term "biorefinery." and grammatical variants thereof (e.g., "biorefining"), refers to a facility that integrates biomass conversion processes and equipment to produce biofuels and/or biochemicals from biomass. The equipment for use in the biorefinery systems of the present disclosure includes any suitable equipment for performing the methods described herein. Such equipment includes, but is not limited to, mechanical size-reduction equipment (e.g., grinders, millers, and the like), transport conduits (e.g., hoses, pipes, conveyers, and other fluid conduits), separation equipment (e.g., decanters, centrifuges, distillation columns, molecular sieves, and the like), non-reactor tanks, seed train tanks, bioreactors, water filtration equipment, filtration equipment (e.g., belt filters, vacuum belt filter, filter press, and the like), concentration equipment (e.g., evaporators, vapor-compression evaporation equipment, molecular sieves, and the like), steam generators, heat exchangers, pumps, compressors, boilers, water purification systems (e.g., reverse osmosis, filtration, deionizers, aerobic and anaerobic digesters, and the like), storage tanks, and the like, and any other equipment suitable for use in performing the methods described herein, and any combination thereof.

The embodiments described herein comprise a series of concurrent, countercurrent, and single pass steps for the conversion of lignocellulosic material into biofuels and/or biochemicals and removal of impurities to enhance biorefinery production. Referring to FIG. 1, illustrated is a schematic flowchart demonstrating one or more aspects of the biological conversion platform of sugars obtained from lignocellulosic biomass of the present disclosure.

As shown, in one or more aspects, biomass comprising lignocellulosic material(s) is deconstructed in the deconstruction portion of the biological conversion platform, known as the pretreatment step. It is to be appreciated that although a deconstruction step is shown in FIG. 1, deconstruction of the lignocellulosic biomass is not necessary and may optionally be omitted, without departing from the scope of the present disclosure. That is, non-deconstructed biomass (raw lignocellulosic material, such as agricultural residue, and the like) may be used in accordance with the methods and systems of the present disclosure.

In this step, the biomass is deconstructed into its main constituent parts—hemicellulose, cellulose, and lignin—using one or more pretreatment methods. Such pretreatment methods may include, but are not limited to, physical, physio-chemical, chemical, or biological methods. Examples include, but are not limited to, mechanical pretreatments (e.g., grinding, milling, and the like), hot water or steam (explosion) pretreatments, ammonia fibre expansion (AFEX) pretreatments, acid or alkaline pretreatments (e.g., sulfuric acid, sodium hydroxide, and the like), oxidizing agent pretreatments (e.g., hydrogen peroxide, employing ozonolysis, and the like), sulfite pulping, fungal pretreatments, enzymatic pretreatments, solvent-assisted extraction, and the like, and any combination thereof.

During deconstruction, hemicellulose may release pentose and hexose monosaccharide sugars. Pentose encompasses any monosaccharide comprising five atoms of carbon, such as xylose, rhamnose, arabinose, and the like. Hexose encompasses any monosaccharide comprising six atoms of carbon, such as glucose, galactose, mannose, and the like. The relative amounts of pentose and hexose sugars released from hemicellulose depends on the source of lignocellulosic biomass and the employed pretreatment technologies. Other impurity by-products may additionally be released during deconstruction such as, for example, organic acids (e.g., lactic acid, formic acid, acetic acid, carboxylic acid, furoic acid, and the like), furans (e.g., furfurals, hydroxymethylfurfuals, and the like), phenolics (e.g., syringaldehyde, vanillin, coniferyl aldehyde, and the like), and the like, and any combination thereof. As described above, these impurities can interfere or otherwise inhibit downstream processing of the lignocellulosic material into biofuel and/or biochemicals.

Obtained deconstructed lignocellulosic biomass 100 is thereafter treated in the hydrolysis portion of the biological conversion platform described herein to further release sugars from the cellulose and any remaining hemicellulose. Hydrolysis may be performed, for example, using enzymatic hydrolysis, such as by use of cellulose enzyme, typically in a hydrolysis reactor. The enzymatic hydrolysis portion converts at least the cellulose to hexose monosaccharides, such as glucose, and may yield additional pentose monosaccharides (e.g., in addition to those obtained from the deconstruction of the hemicellulose). In some instances, prior to hydrolysis, the deconstructed lignocellulosic biomass 100 may be dried or otherwise dewatered to reduce water content.

After hydrolysis, the resultant hydrolysis stream 101 comprises various compounds represented by primarily water, a mixture of monosaccharides (e.g., pentose and hexose), lignin, and the various impurities. The hydrolysis stream 101 is thereafter processed to remove at least a portion of lignin (in solid form) and other insoluble solids (e.g., salts, decomposed lignin polymer components, and the like) in the lignin separation portion of the biological conversion platform of the present disclosure. Lignin may be separated from the hydrolysis stream 101 by any suitable means including, but not limited to, lignin depolymerization, lignin filtration, and the like, and any combination thereof. In some aspects, the insoluble lignin in the aqueous hydrolysis stream 101 may be removed by any type of filtration (e.g., belt or vacuum belt filtration).

Two resultant streams are therefore obtained after the lignin separation step, lignin-free or substantially free (i.e., mostly but not necessarily wholly) stream 103 and lignin-rich stream 104. As used herein, the term "lignin-free stream." and grammatical variants thereof refers to a liquid stream comprising less than about 40% insoluble solids, including lignin, decomposed lignin polymer components, and salts, by weight of the lignin-free stream, including less than about 30%, less than about 20%, less than about 10%, and including about 0% by weight of the lignin-free stream, encompassing any value and subset therebetween. The amount of insoluble solids remaining in the lignin-free stream may depend on a number of factors including, but not limited to, the species of microorganism being processed and the manner and cultivation conditions (e.g., components of the cultivation water slurry), the method of hydrolysis selected, the method of separation selected, and the like, and any combination thereof. In various aspects, the lignin-free stream comprises less than about 30% of lignin and decomposed lignin polymer components by weight of the lignin-free stream (i.e., excluding other insoluble solids), including less than about 20%, less than about 10%, and including about 0% by weight of the lignin-free stream, encompassing any value and subset therebetween. Generally, the lignin-free stream retains greater than about 0.5% of insoluble solids by weight of the lignin-free stream. The lignin-rich stream 104 accordingly retains the insoluble solids removed from the hydrolysis stream 101, water, and potentially a small portion of the impurities from the hydrolysis stream 101.

In one or more instances, a portion of the lignin-rich stream 104 may be transported to a boiler/steam generator to generate steam 105 for power production (e.g., to produce steam for a turbine to produce electricity and/or steam), such as to supply heat and power for one or more aspects of the biological conversion process described herein. The boiler/steam generator may be any type of power generator, for example, such as a Combined Heat and Power (CHP) unit. As described hereinbelow, other waste streams containing organic materials obtained throughout the biological conversion process, including lignin pyrolysis, impurities removal, anaerobic digestion, and other processes may be fed to the boiler/steam generator to produce power for use in the conversion process itself or other processes performed in the biorefinery.

At least a portion of the lignin-rich stream 104 is used in accordance with the present disclosure to produce LbAC to be used as an adsorbent for removal of the impurities within the lignin-free stream 103. The particular amount of lignin required to produce the LbAC may depend on a number of factors including, but not limited to, the concentration and type of impurities present in the lignin-free stream 103, the selected bioconversion technique (e.g., certain microorganisms may be more tolerant of the impurities compared to others), and the like, and any combination thereof. Accordingly, in some instances the entirety of the lignin-rich stream 104 may be diverted to produce the LbAC, such that none is diverted to the boiler/steam generator, without departing from the scope of the present disclosure. In some aspects, the amount of lignin diverted for producing the LbAC compared to the total amount of lignin within the lignin-rich stream 104 is about 10% to about 90%, such as about 30% to about 70% or about 40% to about 50%, encompassing any value and subset therebetween. Accordingly, typically at least a portion of the lignin in the lignin-rich stream 104 is also used for power generation.

In addition to the lignin-rich stream 104, production of the LbAC also utilizes biogas produced as a result of waste water reprocessing. With continued reference to FIG. 1, various waste waters 106 produced throughout the biological conversion process (or other processes performed in the biorefinery. e.g., waste water 107) can be reprocessed, such as by using an anaerobic digester to remove organic impurities. The anaerobic digester generates biogas 108 (i.e., gaseous fuel, such as methane, produced by fermentation of organic matter) and liquid effluent 109. The liquid effluent 109 may be further treated by filtration or other purification methods and recycled back into the biological conversion process described herein or used in other processes. The biogas 108 may be recycled to the boiler/steam generator to generate steam to produce power. At least a portion of the biogas 108, however, is also diverted for the production of the LbAC.

As shown, at least a portion of the lignin-rich stream 104 and at least a portion of the biogas 108 is treated in the lignin pyrolysis portion of the biological conversion platform to produced carbonized lignin, such as within a pyrolysis reactor. The lignin-rich stream 104 supplies the lignin for carbonization and the biogas 108 from the anaerobic digester is used to displace air and provide an inert atmosphere for the pyrolysis reaction. The heat for the pyrolysis reaction may be provided by the boiler/steam generator due to the burning of one or more organic materials therein. Moreover, because the biogas 108 supplied in the lignin pyrolysis portion does not participate in the pyrolysis reaction, it may be returned to the boiler/steam generator (and burned) to further produce energy. The pyrolysis reaction generates a carbonaceous material (biochar) stream 113 and a pyrolysis effluent stream 114. The pyrolysis effluent stream 114 is gaseous and composed of water, light organic gases, and hetero-elements. The pyrolysis effluent stream 114 may be further returned to the boiler/steam generator to assist in energy production for the conversion process or other processes within the biorefinery, or otherwise vented.

Depending on the moisture content of the lignin-rich stream 104, the lignin-rich stream 104 may require drying or otherwise dewatering (not shown) prior to performing the pyrolysis reaction to reduce the water generated during the pyrolysis step. In some instances, the lignin-rich stream 104 has a moisture content of less than or equal to about 10% by weight, or more preferably less than or equal to about 5% by weight, including about 0% by weight, encompassing any value and subset therebetween, prior to performing lignin pyrolysis. Drying may be performed by any suitable methods including, but not limited to, ambient air drying, thermal drying, solar drying, mechanical dewatering (e.g., filter press, such as plate and frame and belt filter), centrifuging, and the like, and any combination thereof.

Additionally, the pyrolysis reaction step may be facilitated by diverting a portion of any or all of lignocellulosic biomass (raw), deconstructed lignocellulosic biomass 100, and hydrolysis stream 101 to the pyrolysis reaction step to increase the yield of the LbAC, without departing from the scope of the present disclosure. Combinations of the aforementioned materials may also be utilized in the pyrolysis reaction step, in one or more aspects.

The biochar in the biochar stream 113 is activated in the activation portion of the biological conversion process described herein. Activation may be performed in the presence of an oxidizing gaseous stream (e.g., carbon dioxide ($CO_2$) and/or air (e.g., oxygen ($O_2$)-containing gaseous streams) 115 using an oxidation reaction (e.g., a mild oxidation reaction) (or "oxidative activation"). In some instances, as shown in FIG. 1, a portion of the vented gas (e.g., flue gas) 115 from the boiler/steam generator may be used as the oxidizing gaseous stream. Oxidizing gaseous stream 115 originating from the boiler/steam generator may comprise, for example, about 10% to about 15% by volume $CO_2$, about 30% to about 35% by volume steam, and about 2% by volume of residual $O_2$. It will be appreciated, however, that the oxidizing gaseous stream 115 may be provided from any other source to perform the activation step of the methods and systems of the present disclosure.

The final LbAC 117 is formed after activation is complete and allowed to cool. The method of determining whether activation is complete is not considered particularly limiting. An example of a suitable method for determining whether activation is complete includes, but is not limited to, nitrogen sorption measurement which provides surface are per volume, as described hereinbelow. Higher activation of the LbAC correlates to higher surface area. The LbAC 117 is combined with the lignin-free stream 103 in the impurities removal portion of the biological conversion process of the present disclosure. The LbAC 117 may be contacted with the lignin-free stream 103, for example, using an adsorption column to facilitate removal of the impurities from the lignin-free stream 103. For example, the LbAC 117 may be first fed to the adsorption column and, thereafter, the lignin-free stream 103 is fed to the adsorption column. The adsorption column may operate either with co-current downward flow or counter-current flow with the flowing lignin-free stream 103. In various instances, adsorption column may be a moving bed adsorption column, for example, in which the LbAC 117 is charged to a hopper vessel which then feeds the moving bed adsorption column. The rate of the solid flow of the LbAC 117 through the moving bed adsorption column may be set to the rate of the LbAC exhaustion.

Gaseous stream 118 (e.g., remaining from the oxidizing gaseous stream 115) remaining after the activation step may be vented for removal.

It is to be appreciated that while FIG. 1 illustrates the lignin pyrolysis step and activation step as separate steps (e.g., performed in separate vessels or reactors), the lignin pyrolysis step and the activation step may be performed in a single vessel or reactor, without departing from the scope of the present disclosure.

Advantageously, unlike traditional impurity removal processes, the LbAC adsorption technique employed according to the present disclosure does not require regeneration of the adsorption bed when the LbAC is exhausted (i.e., saturated with impurities). As such, there is no requirement for a swing bed system in which one bed is used for adsorption while the other bed is being regenerated. Instead, new LbAC is merely reproduced using the integrated bioconversion process described herein after removal of exhausted LbAC (e.g., removal from the adsorption column). Further, the exhausted LbAC can be sent to the boiler/steam generator to facilitate power generation, as described hereinbelow.

With continued reference to FIG. 1, the now impurity-free (or substantially free) purified lignin-free stream 120 may be further processed according to one or more aspects of the present disclosure. As used herein, the term "purified lignin-free stream, and grammatical variants thereof, refers to a liquid stream comprising less than about 30% of impurities of organic acids, furans, and phenolics, including less than about 20%, less than about 10%, less than about 5%, and including about 0% by weight of the purified lignin-free stream, encompassing any value and subset therebetween. The amount of impurities remaining in the purified lignin-free stream may depend on a number of factors including, but not limited to, the type of biomass, the deconstruction process or processes selected, the downstream use of purified lignin-free stream, and the like, and any combination thereof. In various aspects, the purified lignin-free stream comprises a reduction of impurities of organic acids, furans, and phenolics by about 90% compared to the lignin-free stream prior to purification using lignin-based activated carbon, including about 50%, about 20%, and including about 0) % by weight, encompassing any value and subset therebetween.

The purified lignin-free stream 120 may comprise a sugar concentration that is relatively low compared to the desired sugar concentration. Although not necessary, the purified lignin-free stream 120 may be concentrated in a sugar concentration step as part of the biological conversion process of the present disclosure to facilitate production of the biofuel and/or biochemicals, such as to reduce equipment size requirements (e.g., smaller bioreactors, and the like) and aid in processing. Accordingly, when used, the sugar concentration step is performed in order to enhance the sugar concentration in the range of about 30% to about 60%, 40% to about 50%, or about 45% to about 50%, by weight of the purified lignin-free stream 120, encompassing any value and subset therebetween. Sugar concentration may be achieved by any suitable methods including, but not limited to, vapor-compression evaporation (e.g., mechanical vapor compression or thermocompression), membrane filtration (e.g., ultrafiltration membranes), reverse osmosis, and the like, and any combination thereof. Excess water 121 derived during the sugar concentration step may be removed from the sugar concentration portion and sent for further water treatment processing and reuse in the biological conversion process.

Exhausted LbAC 119 from the impurity removal portion of the methods and systems described herein may be sent to the boiler/steam generator for power generation.

The concentrated sugar stream 122 is thereafter processed for bioconversion of the monosaccharides therein into biofuel and/or biochemicals. Any suitable bioconversion technique may be used in accordance with the methods and systems of the present disclosure, including bioconversion using one or more aerobic or anaerobic techniques (e.g., using non-genetically modified or genetically modified bacteria.

Embodiments Listing

The present disclosure provides, among others, the following embodiments, each of which may be considered as optionally including any alternate embodiments.

Clause 1. A method comprising: hydrolyzing lignocellulosic biomass, thereby forming a hydrolysis steam: separating lignin from the hydrolysis stream, thereby forming a lignin-rich stream and a lignin-free stream; and purifying the lignin-free stream using lignin-based activated carbon, thereby producing a purified lignin-free stream.

Clause 2. The method of Clause 1, further comprising deconstructing the lignocellulosic biomass prior to the hydrolyzing.

Clause 3. The method of Clause 1 or Clause 2, further comprising processing lignin from at least a portion of the lignin-rich stream to produce the lignin-based activated carbon.

Clause 4. The method of Clause 3, further comprising treating waste water using an anaerobic digester, thereby generating biogas and wherein at least a portion of the biogas is used during the processing.

Clause 5. The method of Clause 3 or Clause 4, wherein the processing comprises lignin pyrolysis and oxidative activation.

Clause 6. The method of Clauses 3 to 5, further comprising drying the lignin-rich stream prior to the processing.

Clause 7. The method of Clause 6, wherein the lignin-rich stream is dried to a moisture content of less than or equal to about 10% by weight.

Clause 8. The method of any of the preceding Clauses, wherein purifying the lignin-free stream using lignin-based activated carbon is performed using an adsorption column.

Clause 9. The method of Clause 8, wherein the adsorption column is a moving bed adsorption column.

Clause 10. The method of any of the preceding Clauses, further comprising bioconverting the purified lignin-free stream to produce one or more of a biofuel and biochemical.

Clause 11. The method of any of the preceding Clauses, further comprising: concentrating the purified lignin-free stream to increase a sugar concentration thereof, and bioconverting the concentrated, purified lignin-free stream to produce one or more of a biofuel and biochemical.

Clause 12. The method of any of the preceding Clauses, wherein the purified lignin-free stream comprises less than about 30% of impurities of organic acids, furans, and phenolics by weight of the purified lignin-free stream.

Clause 13. A system comprising: a biorefinery that comprises integrated equipment to convert biomass to produce at least one or more of a biofuel and biochemical, the biorefinery configured to perform the method of: hydrolyzing lignocellulosic biomass, thereby forming a hydrolysis steam: separating lignin from the hydrolysis stream, thereby forming a lignin-rich stream and a lignin-free stream; and purifying the lignin-free stream using lignin-based activated carbon.

Clause 14. The system of Clause 13, further comprising deconstructing the lignocellulosic biomass prior to the hydrolyzing.

Clause 15. The system of Clause 13 or Clause 14, further comprising processing lignin from at least a portion of the lignin-rich stream to produce the lignin-based activated carbon.

Clause 16. The system of Clause 15, further comprising treating waste water using an anaerobic digester, thereby generating biogas and wherein at least a portion of the biogas is used during the processing.

Clause 17. The system of Clause 15 or Clause 16, wherein the processing comprises lignin pyrolysis and oxidative activation.

Clause 18. The system of Clauses 15 to 17, further comprising drying the lignin-rich stream prior to the processing.

Clause 19. The system of Clause 18, wherein the lignin-rich stream is dried to a moisture content of less than or equal to about 10% by weight.

Clause 20. The system of Clauses 13 to 19, wherein purifying the lignin-free stream using lignin-based activated carbon is performed using an adsorption column.

Clause 21. The system of Clauses 13 to 20, further comprising bioconverting the purified lignin-free stream to produce one or more of a biofuel and biochemical.

Clause 22. The system of Clauses 13 to 21, wherein the purified lignin-free stream comprises less than about 30% of impurities of organic acids, furans, and phenolics by weight of the purified lignin-free stream.

To facilitate a better understanding of one or more aspects of the present disclosure, the following example is given. In no way should the following example be read to limit, or to define, the scope of the disclosure.

Example

In the following example, the effectiveness of LbAC generated according to one or more aspects of the present disclosure to remove certain impurities found in deconstructed and hydrolyzed lignocellulosic biomass was evaluated.

Solid LbAC was generated by carbonization of dry lignin in a quartz tube at 800° C. under argon (Ar) gaseous flow, followed by activation using CO2 for four (4) hours. The temperature ramping rate was 50° C./min. The flow rate ratio of Ar/CO2 during activation was 50/50 at 800° C. The LbAC was evaluated for various impurity removal using batch experiments and compared to commercially available powder activated carbon (AC) obtained from Sigma-Aldrich (St. Louis, Missouri). Table 1 shows the physical characteristics of the commercial AC and the LbAC based on N2 isotherm.

TABLE 1

|  | Surface Area ($m^2/g$) | Pore Volume (cc/g) | Micropore Volume (cc/g) |
| --- | --- | --- | --- |
| Commercial AC | 1099 | 0.88 | 0.35 |
| LbAC | 771 | 0.39 | 0.29 |

Figure 3:
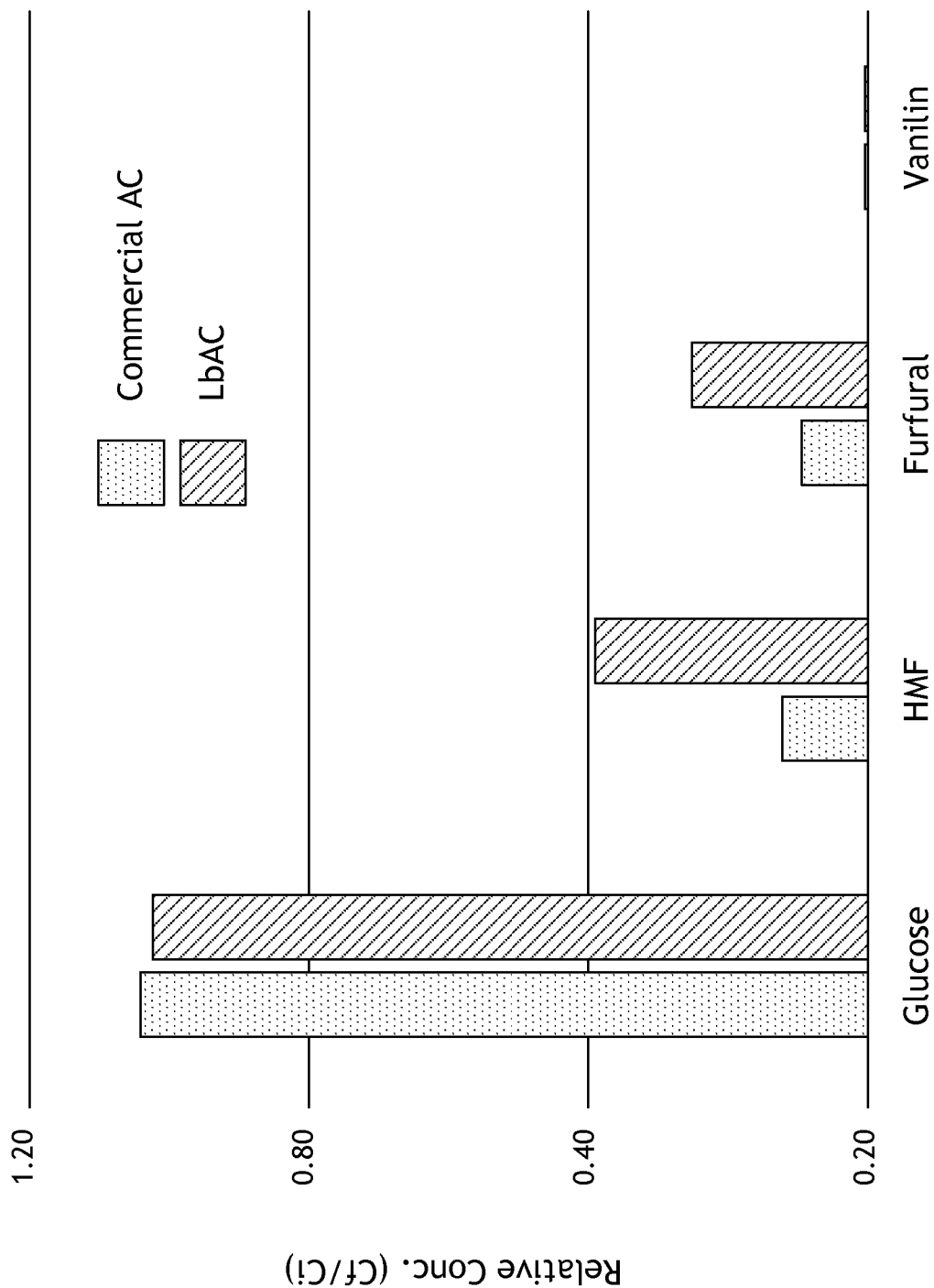
FIG. 3 is a graph comparing impurity removal using commercially available activated carbon and lignin-based activated carbon.

It is believed that higher surface areas for LbAC may be achievable based on pyrolysis and activation conditions. FIG. 3 shows the N2 isotherm comparing the commercial AC and the LbAC. The high N2 adsorption in the low P/Po range (relative pressure) suggests the LbAC is mainly microporous, whereas the commercial AC shows substantial mesoporosity as indicated by high N2 adsorption in the higher P/Po range.

Three impurity solutions were prepared by separately dissolving hydromethyl furfuraldehyde (HMF) furfural, and vanillin in HPLC grade water. A control solution was prepared by dissolving glucose in HPLC grade water. Glucose is a key component for bioconversion of lignin-free hydrolysate and, thus, it is critical that adsorption of impurities does not also adsorb glucose to maximize biofuel and biochemicals production. Each solution was divided and either LbAC was added or the commercial AC was added, thereby resulting in eight (8) samples. Each of the samples was agitated in a shaker at room temperature for three (3) hours for equilibration. The supernatant liquid phase was analyzed using high-performance liquid chromatography (HPLC) to obtain the concentration of inhibitors. The HPLC system from Waters Corporation (Milford. MA) was equipped with a refractive index detector: an Agilent Technologies, Inc. (Santa Clara. CA) HI-PLEX-H column (300× 4.7 mm id.) packed with 8 µm particles was used for separation; isocratic elution was set using 0.005M H2SO4 in HPLC grade water as the mobile phase; and the flow rate was 0.8 ml/min at 60° C.

The results are shown in FIG. 3 and represented as relative impurity concentration before and after adsorption, where Ci is initial impurity concentration and Cf is final impurity concentration. As shown, the LbAC shows substantial removal of impurities. Indeed, more than 60% of the HMF, furfural, and vanillin was adsorbed using the LbAC. Moreover, no appreciable amount of glucose was lost by exposure to the LbAC. It is believed that the greater adsorption observed by the commercial AC is due to it having a higher surface area compared to LbAC. Nevertheless, the results demonstrate that LbAC can be used as an effective impurity remover for lignocellulosic bioconversion into biofuel and/or biochemicals.

Therefore, the present disclosure is well adapted to attain the ends and advantages mentioned as well as those that are inherent therein. The particular examples and configurations disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present disclosure. The examples illustratively disclosed herein suitably may be practiced in the absence of any element that is not specifically disclosed herein and/or any optional element disclosed herein. While compositions and methods are described in terms of "comprising." "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
hydrolyzing lignocellulosic biomass, thereby forming a hydrolysis steam;
separating lignin from the hydrolysis stream, thereby forming a lignin-rich stream and a lignin-free stream;
selecting an amount of lignin from at least a portion of the lignin-rich stream to produce an optimal amount of lignin-based activated carbon, wherein the optimal amount of lignin-based activated carbon is sufficient to remove a threshold amount of impurities in the lignin-free stream to form a purified lignin-free stream without generating excess lignin-based activated carbon than is needed to remove the threshold amount of impurities;
processing the amount of lignin from at least a portion of the lignin-rich stream to produce the optimal amount of lignin-based activated carbon; and
purifying the lignin-free stream using lignin-based activated carbon, thereby producing the purified lignin-free stream and an impure lignin-based activated carbon with impurities.

2. The method of claim 1, wherein the processing includes pyrolysis of the portion of the lignin-rich stream and further comprising burning the impure lignin-based activated carbon to produce heat used in the pyrolysis.

3. The method of claim 1, further comprising burning the impure lignin-based activated carbon to produce power.

4. The method of claim 2, further comprising treating waste water produced by the processing of the amount of lignin, wherein the waste water is treated using an anaerobic digester, thereby generating biogas and wherein at least a portion of the biogas is used during the pyrolysis to provide an inert atmosphere for a pyrolysis reaction.

5. The method of claim 3, wherein the processing comprises oxidative activation.

6. The method of claim 3, further comprising drying the lignin-rich stream prior to the processing.

7. The method of claim 6, wherein the lignin-rich stream is dried to a moisture content of less than or equal to about 10% by weight.

8. The method of claim 1, wherein purifying the lignin-free stream using lignin-based activated carbon is performed using an adsorption column.

9. The method of claim 8, wherein the adsorption column is a moving bed adsorption column.

10. The method of claim 1, further comprising bioconverting the purified lignin-free stream to produce one or more of a biofuel and biochemical.

11. The method of claim 1, further comprising:
concentrating the purified lignin-free stream to increase a sugar concentration thereof, and
subsequent to the concentrating, bioconverting the purified lignin-free stream to produce one or more of a biofuel and biochemical.

12. The method of claim 1, wherein the purified lignin-free stream comprises less than about 30% of impurities of organic acids, furans, and phenolics by weight of the purified lignin-free stream.

13. A system comprising: a biorefinery that comprises integrated equipment to convert biomass to produce at least one or more of a biofuel and biochemical, the biorefinery configured to perform the method of: hydrolyzing lignocellulosic biomass, thereby forming a hydrolysis steam; separating lignin from the hydrolysis stream, thereby forming a lignin-rich stream and a lignin-free stream; selecting an amount of lignin from at least a portion of the lignin-rich stream to produce an optimal amount of lignin-based activated carbon, wherein the optimal amount of lignin-based activated carbon is sufficient to remove is a threshold amount of impurities in the lignin-free stream to form a purified lignin-free stream without generating excess lignin-based activated carbon than is needed to remove the threshold amount of impurities; processing the amount of lignin from at least a portion of the lignin-rich stream to produce the optimal amount of lignin-based activated carbon; and purifying the lignin-free stream using lignin-based activated carbon, thereby producing the purified lignin-free stream and an impure lignin-based activated carbon with impurities.

14. The system of claim 13, further comprising deconstructing the lignocellulosic biomass prior to the hydrolyzing.

15. The system of claim 13, further comprising processing lignin from at least a portion of the lignin-rich stream to produce the lignin-based activated carbon.

16. The system of claim 15, further comprising treating waste water using an anaerobic digester, thereby generating biogas and wherein at least a portion of the biogas is used during the processing.

17. The system of claim 15, wherein the processing comprises lignin pyrolysis and oxidative activation.

18. The system of claim 15, further comprising drying the lignin rich stream prior to the processing.

19. The system of claim 18, wherein the lignin-rich stream is dried to a moisture content of less than or equal to about 10% by weight.

20. The system of claim 13, wherein purifying the lignin-free stream using lignin-based activated carbon is performed using an adsorption column.

21. The system of claim 13, further comprising bioconverting the purified lignin-free stream to produce one or more of a biofuel and biochemical.

22. The system of claim 13, wherein the purified lignin-free stream comprises less than about 30% of impurities of organic acids, furans, and phenolics by weight of the purified lignin-free stream.

* * * * *